United States Patent [19]

Fournier et al.

[11] Patent Number: 4,647,082
[45] Date of Patent: Mar. 3, 1987

[54] RELEASABLE PUSH-IN CONNECT FITTING

[75] Inventors: Paul J. E. Fournier, Jackson; Ernest F. Kulikowski, Marshall, both of Mich.

[73] Assignee: Aeroquip Corporation, Jackson, Mich.

[21] Appl. No.: 840,141

[22] Filed: Mar. 17, 1986

[51] Int. Cl.⁴ .............................................. F16L 37/18
[52] U.S. Cl. .................................. 285/315; 285/319; 285/320; 285/921
[58] Field of Search ............... 285/308, 319, 315, 320, 285/921

[56] References Cited

U.S. PATENT DOCUMENTS

| | | | |
|---|---|---|---|
| 2,465,197 | 3/1949 | Chatham | 285/33 |
| 3,447,819 | 6/1969 | Borsum et al. | 285/315 X |
| 3,933,378 | 1/1976 | Sandford et al. | 285/319 |
| 4,135,745 | 1/1979 | Dehar | 285/319 |

FOREIGN PATENT DOCUMENTS 281086  9/1970  U.S.S.R. ............................ 285/319

Primary Examiner—Richard J. Scanlan, Jr.
Attorney, Agent, or Firm—Beaman & Beaman

[57] ABSTRACT

A coupling fitting consisting of male and female parts wherein connection is achieved merely by axially inserting the male into the female part. Latching is produced by a plurality of resilient fingers mounted on the female part engaging with an annular shoulder formed on the male part, and release of the fingers is achieved by an axially displaceable sleeve permanently mounted on the male part displaceable to a release position engaging the fingers and removing the fingers from the shoulder permitting the male part to be removed from the female part. The release sleeve may be of a configuration to discourage tampering and uncoupling, or may include a knob to facilitate manual actuation.

7 Claims, 9 Drawing Figures

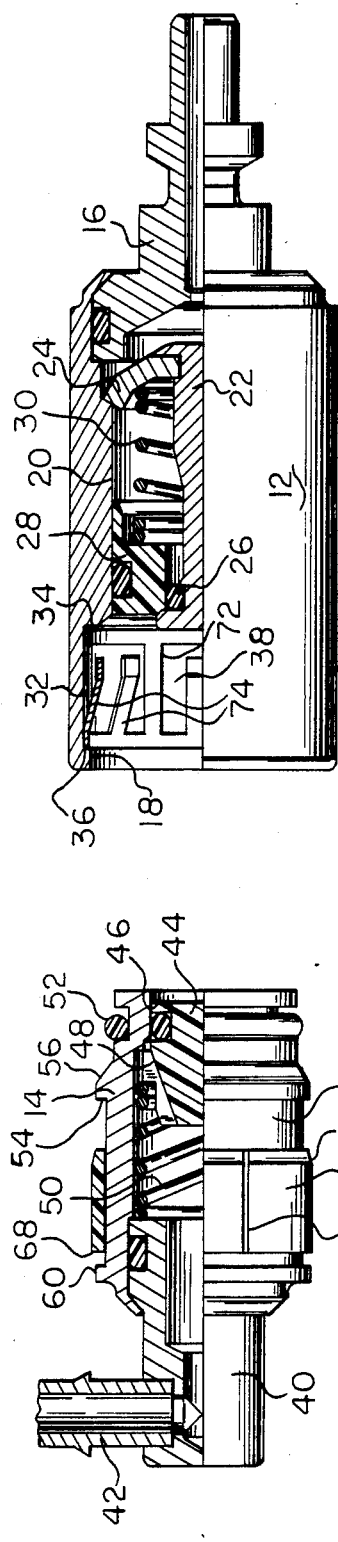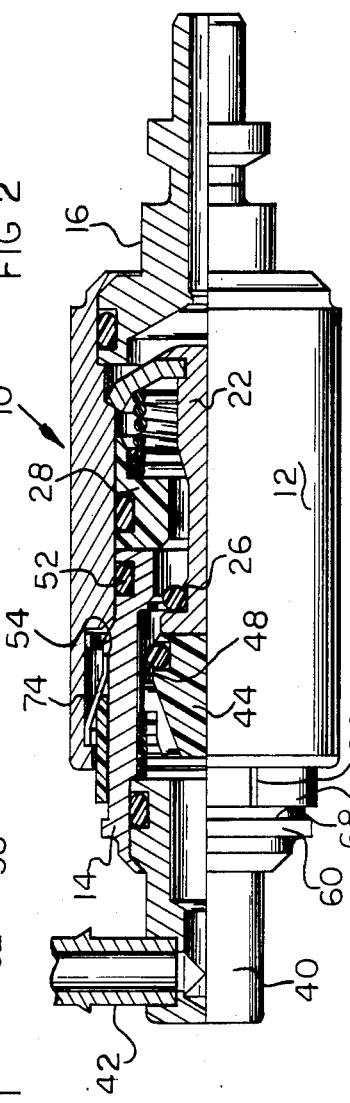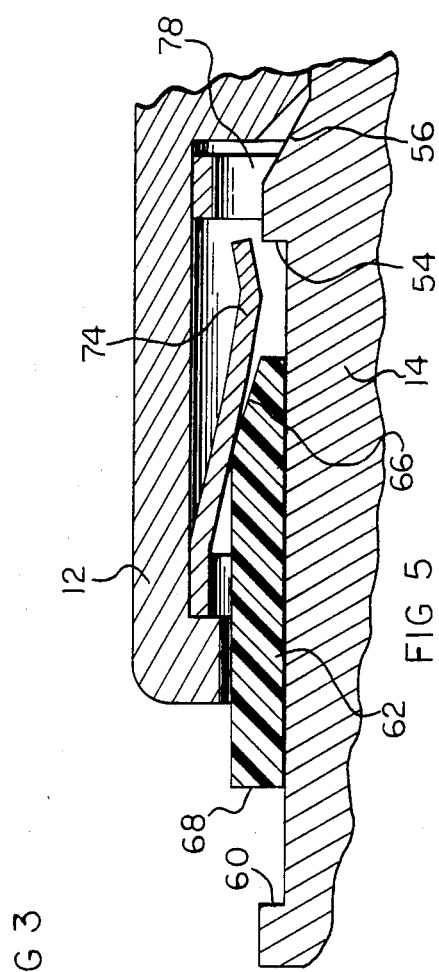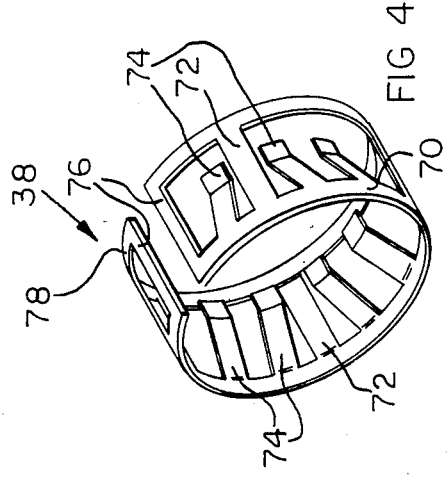

RELEASABLE PUSH-IN CONNECT FITTING

BACKGROUND OF THE INVENTION

Fluid coupling fittings normally consist of two primary components or parts interconnectable in a sealed relationship to permit the flow of fluid therebetween. A wide variety of latching structure has been used to interconnect the parts or halves of fluid couplings, and the coupling and latch art has become highly developed to provide apparatus suitable for meeting the requirements of a variety of installations and circumstances.

A basic coupling fitting includes a female member adapted to sealingly receive a male member therein wherein relative axial displacement of the parts permits interconnection, and the connection is maintained by latch structure, the most popular being of a threaded nut type. It is also known to interconnect female and male coupling parts by latch structure which automatically functions merely by inserting the male part a predetermined axial distance into the female part. Such a push-in latch connection minimizes the operations necessary to interconnect the coupling parts and may be automatically functional requiring no additional action by the user than to insert the male part into the female part.

One type of push-in coupling connection which is known and desirable for its positive action and inexpensive manufacture utilizes resilient fingers mounted in the female part which engage with a shoulder formed on the male part upon the parts achieving a predetermined axial relationship. The resilient fingers are, initially, displaced radially outwardly by the shoulder as the male part is inserted into the female part, and after the fingers ride over the shoulder, they will snap into axial alignment with the shoulder to prevent withdrawal of the male part. Examples of such push-in fittings are shown in U.S. Pat. Nos. 3,933,378; 4,135,745; and in the assignee's application Ser. No. 706,442 filed Feb. 27, 1985, now U.S. Pat. No. 4,637,640.

Push-in connect fittings of the type shown in the above patents permit a concise, efficient and low-cost fitting to be manufactured, but as the resilient fingers are located within the female member, it is very difficult to uncouple such fittings, and most fittings of this type are intended to be irreversibly connectable, i.e. not disconnected after the initial interconnection of the parts has occurred. In those push-in fittings of the aforedescribed construction wherein it is intended to be able to uncouple the fitting parts a special tool must be used which is inserted into the female part for engagement with the fingers to displace the fingers from engagement with the male part shoulder and permit the parts to be separated.

It is an object of the invention to provide a push-in connection coupling fitting wherein the coupling parts are interconnected by resilient fingers and wherein finger release means are permanently mounted upon the coupling.

Another object of the invention is to provide a push-in connection for couplings utilizing resilient fingers wherein a permanent release sleeve is mounted upon the male fitting part and is axially displaceable thereon between finger locking and finger release positions.

A further object of the invention is to provide a push-in connection for couplings utilizing resilient fingers in the latch structure wherein a release sleeve is permanently mounted upon the male coupling part and the release sleeve is of such configuration, appearance, and operation as to discourage tampering and release of the finger latch mechanism.

An additional object of the invention is to provide a push-in connection for couplings utilizing resilient finger latch mechanisms wherein a finger release sleeve is permanently mounted upon the male part and is of such configuration as to be readily manually actuated between finger locking and finger release positions.

In the practice of the invention the male coupling part is inserted into the open end of the female part and an O-ring seal therebetween produces a fluid-tight relationship. Connection is achieved solely by relative axial part displacement and a push-in connection is produced.

Connection or latching is achieved by a plurality of resilient fingers mounted within the female part adjacent the open end thereof. The male part includes an annular shoulder which radially outwardly displaces the free end of the fingers as the male part is inserted into the female part passage and after sufficient relative axial displacement has occurred, the fingers will ride over the shoulder and "snap" into an axial abutting relationship with the shoulder preventing withdrawal of the male part.

The male part includes an annular release sleeve axially displaceable thereon having an inner end which is received within the female part and is capable of engaging the inside surfaces of the fingers. The outer end of the release sleeve extends from the female part and is exteriorly accessible. In one embodiment, the outer end of the release sleeve is of such a configuration as to not be recognizable as an operating component, while in another embodiment of the invention the outer end of the release sleeve is provided with a knob to facilitate manual actuation of the sleeve.

The release sleeve is easily axially displaced on the male member wherein the fingers will engage and slide the release sleeve to its inoperative finger locking position during connection of the coupling fitting parts, thereby preventing the release sleeve from inadvertently interfering with the positive connection of the parts achieved by the resilient fingers. However, when it is desired to disconnect the coupling parts an axial force is applied to the exterior portion of the release sleeve causing the sleeve to be axially displaced toward the fingers lifting the fingers from the male part shoulder. Once the fingers have cleared the shoulder the male part may be removed from the female part passage.

In one embodiment of the invention an abutment boss is defined on the male part which limits axial movement of the release sleeve, and the release sleeve is longitudinally slit in order to be temporarily deformed for insertion over the abutment boss to permit location of the release sleeve on the male part.

The permanent mounting of the finger release sleeve on the fitting permits push-in connection for couplings to be readily released, and as the release sleeve of the invention does not add bulk or significant costs to the coupling, its use provides a more versatile push-in connection for couplings than heretofore available.

BRIEF DESCRIPTION OF THE DRAWINGS

The aforementioned objects and advantages of the invention will be appreciated from the following description and accompanying drawings wherein:

FIG. 1 is an elevational, partially sectioned, view of the male part of a coupling fitting in accord with the invention, FIG. 2 is an elevational, partially diametrically sectioned, view of the female part of a coupling in accord with the invention, FIG. 3 is an elevational, partially sectioned, view of the coupling parts shown in FIGS. 1 and 2 in the fully interconnected relationship, FIG. 4 is a perspective view of the resilient finger retainer used with the embodiment of FIGS. 1-3, FIG. 5 is an enlarged, detail, elevational, sectional view of the embodiment of FIGS. 1-4, illustrating the release sleeve in the finger release position.

DESCRIPTION OF THE PREFERRED EMBODIMENTS

Figure 7:
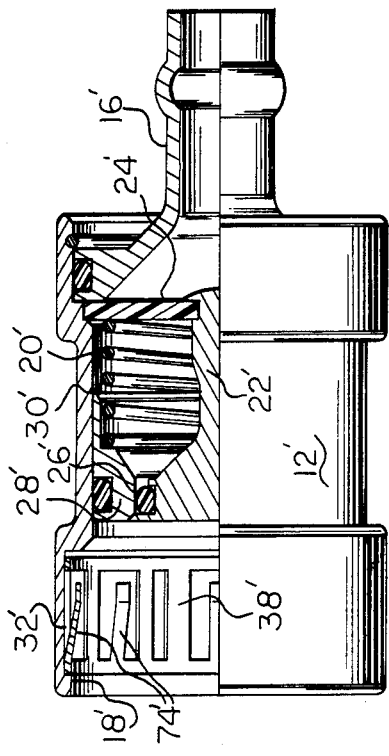
FIG. 7 is an elevational, partially sectioned, view of the female part used with the male part of FIG. 6.
Figure 6:
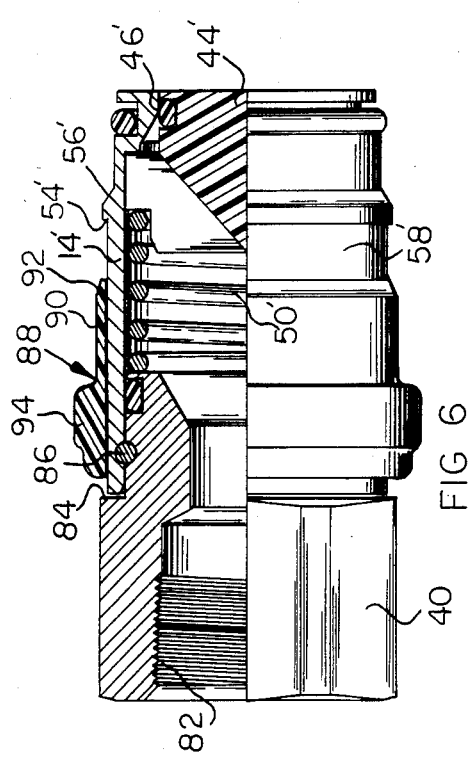
FIG. 6 is an elevational, partially sectioned, view of another embodiment of push-in coupling in accord with the invention illustrating the male part.

One commercial embodiment of the coupling fitting of the invention is shown in FIGS. 1-5. In this embodiment the coupling 10 consists of a cylindrical tubular female part 12 and a generally cylindrical male part 14. The female part 12 is closed at its right end, FIG. 2, by an adapter 16 which is sealed to the body 12 by an O-ring and attached thereto by a swaged lip. A conduit, not shown, such as a hose or the like, may be attached to the adapter 16 for establishing communication between the female body and a fluid circuit, not shown.

The left end of the body 12 is open as defined by the peripheral edge 18, and internally, the body includes the concentric cylindrical passage 20. Within the passage 20 a valve stem 22 is supported upon a spider 24, and the enlarged head of the valve stem includes the O-ring seal 26 located within the usual groove. An annular valve 28 is axially displaceable within the passage 20 between the closed position shown in FIG. 2, wherein the valve engages O-ring 26, and the open position shown in FIG. 3. The valve is biased toward its closed condition by the compression spring 30. It will be appreciated that the aforedescribed valve structure is the conventional poppet valve arrangement often used with self-sealing fluid couplings.

An annular cylindrical recess 32 is defined within the female body 12 adjacent its open end, and the recess 32 is axially defined by inner radial shoulder 34 and outer radial shoulder 36. The latch or retainer generally designated 38, and later described, is received within the recess 32.

The left end of the male body 14, FIG. 1, is closed by the adapter 40 which is mounted to the male body by a deformed lip and a nipple 42 disposed at 90° to the axis of the adapter 40 communicates therewith for receiving a hose, not shown.

Internally, the male body 14 is provided with a passage receiving the axially displaceable synthetic plastic valve 44. The valve 44 engages the cylindrical seat 46 internally defined within the male body 14 and an O-ring sealingly engages seat 46 when the valve 44 is in the closed position shown in FIG. 1. A shoulder 48 defined on the valve 44 engages a shoulder within the body 14 and limits movement of the valve 44 to the right, FIG. 1. A compression spring 50 biases the valve 44 toward its closed position, the spring 50 being interposed between the adapter 40 and the valve.

Externally, the cylindrical nose end of the male body 14 includes a groove receiving the O-ring 52, and the body nose also includes an annular ridge which forms the radial shoulder 54, and the ridge also includes an oblique cam surface 56 for a purpose later described.

The male body 14 also includes a cylindrical surface 58 concentric to the axis of the body 14 which extends from the shoulder 54 to the annular abutment boss 60 which defines a transverse shoulder in axial opposed relationship to the shoulder 54.

The finger release sleeve 62 is preferably formed of a synthetic plastic material and is easily axially displaceably mounted upon the cylindrical surface 58. Sleeve 62 is longitudinally slit at 64 to permit the sleeve to be temporarily "opened" for insertion over the shoulder 54 or boss 60 for positioning upon surface 58. The resilient nature of the sleeve contracts the sleeve upon the surface 58, but the normal sleeve diameter is such that the sleeve may be easily axially displaced on the male body. The release sleeve 62 is of a uniform wall thickness throughout most of its length and includes a slightly beveled nose 66, at its inner end, and the outer end 68 of the sleeve is disposed toward the shoulder boss 60.

The latch or retainer 38 is formed of sheet spring steel and is of a configuration best appreciated from FIG. 4. The retainer is formed into a circular configuration having a normal diameter slightly greater than the diameter of the recess 32 wherein the resiliency of the retainer maintains it within the recess 32. The latch retainer includes an outer ring 70 from which a plurality of long fingers 72 extend, and between the long fingers a plurality of shorter fingers 74 also extend from the ring 70. The ends of the retainer are defined by the long fingers 76, and an inner ring 78 interconnects the inner ends of the long fingers 72 and 76. The fingers 74 are deformed radially inwardly and the free ends of the short fingers 74 are slightly bent wherein the free ends of the fingers 74 will be substantially concentric to the axis of the female body 12 when the retainer is installed, FIGS. 2 and 3.

The retainer 38 is held within the recess 32 by the resilient expansion forces within the retainer due to the necessity to radially contract the retainer when inserting the same into the recess 32. Axial location of the retainer within the recess 32 is insured by engagement of the ring 70 with recess shoulder 36, while ring 78 will engage recess shoulder 34.

Interconnection of the bodies 12 and 14 is achieved by axially aligning the bodies and inserting the nose of male body 14 into the open end of the female body 12. As will be appreciated from FIG. 3, the diameter of the innermost end of body 14 is received within passage 20 and the O-ring 52 establishes a sealed relationship therewith. As the body 14 is inserted into the passage 20, the shoulder cam surface 56 will engage the inwardly disposed fingers 74 outwardly deflecting the fingers as they ride over the annular ridge forming shoulder 54. Once the shoulder 54 aligns with the ends of the fingers 74, the fingers will "snap" inwardly against surface 58 in axial alignment and engagement with shoulder 54 preventing withdrawal of body 14 from body 12.

During this coupling procedure, the release sleeve nose 66 may engage the underside of the fingers 74. However, as the sleeve 62 is freely axially slidable on the surface 58, the engagement with the fingers 74 will slide the sleeve 62 toward the boss 60 as interconnection of the parts takes place, and in its fully coupled and operative condition as shown in FIG. 3, the release sleeve 62 does not interfere with the operation of the coupling procedure. From FIG. 3 it is to be noted that the radial spacing between the female body open edge 18 and the male body surface 58 is slightly greater than the wall thickness of the release sleeve 62 permitting the release sleeve inner end to be readily received within the female open end.

As the body 14 is inserted into the body 12, the end of the stem 22 engages the valve 44 unseating the valve 44 from seat 46, and simultaneously the end of the body 14 engages the valve 28 to unseat the valve 28 from the stem seal 26. Thus, when the bodies are fully connected as shown in FIG. 3 the resultant displacement of valves 44 and 28 has produced a fluid flow path through the coupling in the known manner.

If it is desired to withdraw body 14 from body 12, the release sleeve 62 is axially forced into the female body 12 as shown in FIG. 5. Such an axial displacement of the release sleeve is possible because the outer end 68 of the sleeve 62 is exteriorly accessible, and the end 68 may be engaged with a screwdriver blade or other tool to force the sleeve against the underside of the fingers 74 wherein the sleeve nose 66 will lift the fingers 74 from the surface 58 and out of axial alignment with the shoulder 54. Thereupon, the male body 14 may be easily withdraw from the open end of the body 12.

Reconnecting of the bodies 12 and 14 is achieved by repeating the coupling procedure described above, and it will be appreciated that the use of the release sleeve 62 permits this type of push-in coupling fitting utilizing resilient latching fingers to be easily and repeatedly coupled and uncoupled.

As will be appreciated from FIGS. 1 and 3, the wall thickness of the release sleeve 62 is substantially uniform throughout its length except at nose 66, and this wall thickness is slightly greater than the radial dimension of the shoulder boss 60. Thus, the end 68 of the release sleeve is accessible over the shoulder 60, but the external appearance of the release sleeve is not such as to be readily recognized as being an operative component of the coupling which would permit the coupling parts to be disconnected. When exteriorly viewed, the coupling 10 with parts 12 and 14 connected appears to be free of exteriorly operated latch mechanisms, and as the release sleeve 62 is not easily grasped or manually operated, the disclosed construction discourages tampering and unauthorized separation of bodies 12 and 14.

In FIGS. 6-9, another embodiment of coupling fitting utilizing the inventive concepts is illustrated. In these figures, coupling components functionally equivalent to those previously described are identified by primed reference numerals.

In FIGS. 6-9, the coupling is indicated at 80 and the female body is represented at 12', while the male body is shown in 14'. The female body adapter 16' is sealed with respect to the right end of the body 12' by an O-ring and held in position by a drive wire. The body open end is defined by the edge 18', and the body includes passage 20'. The valve stem 22' is supported by spider 24', and includes O-ring 26' against which valve 28' seals as biased by compression spring 30'. The recess 32' receives the spring finger retainer 38', which is identical to retainer 38, previously described, and the retainer includes the short spring fingers 74' which produce the latching.

The left end of the male body part 14' is closed by the tubular adapter 40' having internal threads 82. A seal ring seals the adapter with respect to the body part 14' and the adapter includes a shoulder 84 which extends slightly radially outwardly from the cylindrical surface 58'. The adapter is connected to body 14' by the drive wire 86. Valve 44' seals against cylindrical seal 46' and the valve is biased by the compression spring 50' toward the closed position. The shoulder 54' is defined at the nose of the male body, as is the annular cam surface 56'.

The release sleeve 88 is of a continuous circumferential configuration, preferably formed of a synthetic plastic material, and is inserted on the surface 58' prior to the adapter 40' being assembled to body 14'. The release sleeve 88 includes an axially extending portion 90 of substantially constant wall thickness having an inner beveled nose 92. At its outer end the release sleeve 88 is provided with an annular enlarged knob 94 which may be readily grasped by the operator's fingers. It will be appreciated that the knob 94 radially extends outwardly beyond the configuration of the adapter 40' and the shoulder 84.

The body parts 12' and 14' are assembled as previously described. The male body 14' is inserted into the passage 20', and during connection the cam surface 56' will radially outwardly deflect the fingers 74' permitting the fingers to pass over the cam surface and snap into alignment with the shoulder 54' to complete latching. If, during this interconnection of the parts, the nose 92 of the release sleeve 88 is engaged by the fingers 74', the fingers will cause the release sleeve to slide on the surface 58' toward the shoulder 84. Of course, during connection the valves 44' and 26' open as described with respect to the prior embodiment.

Figure 8:
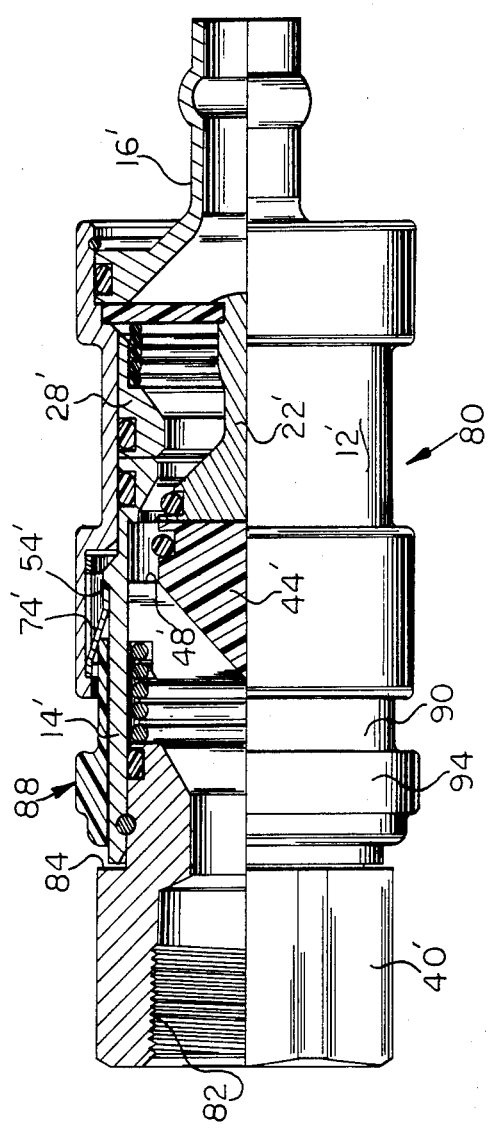
FIG. 8 is an elevational, partially sectioned view of an assembled coupling in fully interconnected relationship utilizing the parts of FIGS. 6 and 7.
Figure 9:
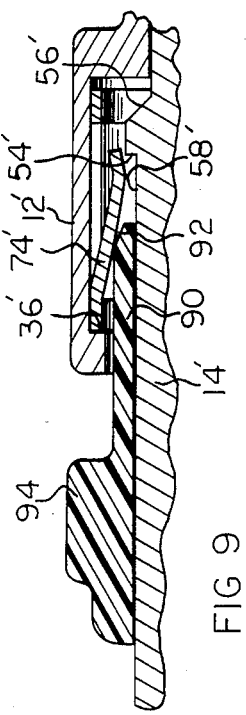
FIG. 9 is an enlarged, detail, sectional view of the resilient fingers and release sleeve of FIG. 8 shown with the release sleeve in the finger releasing position.

If, after connection, it is desired to separate the body parts 12' and 14', the release sleeve knob 94, which is exteriorly accessible as appreciated from FIG. 8, is grasped by the operator's fingers and the sleeve 88 is moved toward the body 12'. This sleeve movement will cause the sleeve nose 92 to engage the underside of the fingers 74' and lift the fingers from the shoulder 54' permitting body 14' to be removed from the female body.

In contradistinction to the embodiment of FIGS. 1-5, the presence of the release sleeve knob 94, and its configuration, identifies the release sleeve as an operating member, and its ready manual operation simplifies releasing of the fingers 74' as compared with the previously described embodiment.

It will be appreciated that by permanently mounting a release sleeve upon the coupling of a push-in coupling fitting, that the advantages of using spring finger latching may be achieved without requiring complicated procedures for releasing the latching. The release sleeve adds no significant bulk or dimension to the coupling, and even relatively small couplings may incorporate the release sleeve without adversely affecting the coupling size. The release sleeve will not inadvertently uncouple the parts, and its operation is dependable without damage to the coupling components.

It is appreciated that various modifications to the inventive concepts may be apparent to those skilled in the art without departing from the spirit and scope of the invention.

We claim:

1. A releasable push-in connect coupling comprising, in combination, a female tubular part having a passage having a longitudinal axis and an open end, a cylindrical concentric recess defined in said passage adjacent said open end, said recess being axially defined by inner and outer axially spaced radial shoulders, a male tubular part having an elongated cylindrical nose end axially receivable within said female part passage open end, a sheet metal retainer received within said recess, said retainer comprising a radially contractible spring steel member consisting of an inner ring, an outer ring, a plurality of axially extending spacer fingers homogeneously extending between said rings maintaining the axial spacing therebetween and a plurality of resilient elongated fingers homogeneously projecting from said outer ring having a radially deflectable free end longitudinally extending toward said inner ring and radially located inwardly thereof, said retainer having a normal diameter greater than that of said recess whereby upon being radially contracted said retainer is received within said recess and resiliently maintained therein with said inner ring adjacent said inner shoulder and said outer ring adjacent said outer shoulder and said resilient fingers' free ends obliquely radially extending toward said passage axis, an annular shoulder defined on said male part nose engagable by said resilient fingers' free ends upon inserting said nose end into said passage a predetermined axial distance preventing withdrawal of said nose end from said passage, seal means disposed between said nose end and said passage, and resilient finger release means mounted upon said male part receivable within said female part open end for selective engagement with said resilient fingers' free ends and axially positionable between a lock position wherein said release means permit engagement of said fingers' free ends with said shoulder and a release position engaging said resilient fingers and radially displacing said fingers' free ends radially outwardly from alignment and engagement with said annular shoulder permitting removal of said nose end from said passage open end.

2. In a releasable push-in connect fitting as in claim 1, said resilient finger release means comprising an annular sleeve having an inner end receivable within said female part open end and an outer end exteriorly accessible when said parts are interconnected by said fingers engaging said annular shoulder.

3. In a releasable push-in connect fitting as in claim 2, a cylindrical surface defined on said male part concentric with said male part nose end, said sleeve being axially slidably received upon said cylindrical surface.

4. In a releasable push-in connect fitting as in claim 3, an annular boss circumferentially defined upon said male part cylindrical surface and radially extending outwardly thereof axially spaced from said annular shoulder, said boss limiting axial movement of said sleeve on said cylindrical surface away from said annular shoulder.

5. In a releasable push-in connect fitting as in claim 4, said sleeve being formed of a resilient material and being axially slit to permit temporary deformation thereof to increase the sleeve internal diameter to permit said sleeve to be inserted over said boss and be received upon said cylindrical surface.

6. In a releasable push-in connect fitting as in claim 3, said sleeve being formed of a synthetic plastic material.

7. In a releasable push-in connect fitting as in claim 3, said sleeve being of a substantially uniform radial thickness throughout its length.

* * * * *